United States Patent Office 3,743,499
Patented July 3, 1973

3,743,499
METHOD OF ENLARGING THE PARTICLE SIZE OF TRANSITION METAL POWDER AND CARBIDES THEREOF
Lars Henry Ramqvist, Nynashamn, Sweden, assignor to Rederiaktiebolaget Nordstjernan, Stockholm, Sweden
No Drawing. Filed Oct. 21, 1971, Ser. No. 191,551
Int. Cl. B22f 9/00; C01b 31/30, 31/34
U.S. Cl. 75—0.5 BB        9 Claims

ABSTRACT OF THE DISCLOSURE

The particle size of transition metal powder selected from the group consisting of Ti, Zr, Hf, V, Nb, Ta, Cr, Mo and W is enlarged by heating said powder at an elevated particle growth-promoting temperature by mixing intimately with the powder a metal doping additive consisting essentially of a particle growth-promoting element selected from the group consisting of Cu, Ag, Au, Fe, Co, Ni, Ru, Rh, Pd, Os, Ir and Pt. Carbide particles of the transition metals can be enlarged during the carburization of the transition metal at elevated temperatures in excess of 1000° C. at which the transition metal reacts with carbon to form the carbide.

---

This invention relates to a method of enlarging the particle size of transition metal powders and also the carbides thereof during the carburization of transition metals with carbon.

STATE OF THE ART

The transition metals Ti, Zr, Hf, V, Nb, Ta, Cr, Mo and W (Groups 4b, 5b and 6b of the Periodic Table) are widely used in the production of refractory metal alloys and in the production of carbides for use in the hard metal industry. For the purposes of this invention, the transition metals and their carbides may be treated as analogous or equivalent to each other and whatever is said as to tungsten, applies equally to the other elements.

Of the foregoing refractory metal carbides, tungsten carbide is particularly of great importance in the hard metal industry. The particle size of this carbide is generally within the range of 1 to 10 microns. The coarser particles are mainly used in rock drills. Coarse tungsten metal powder forms the basis of several other important construction materials and is used in the production of heavy metals, electrical contacts, and the like. The particle sizes referred to herein are in accordance with values obtained with the Fisher sub-sieve sizer.

The production of refractory metal powder by the chlorinated method is economically attractive as compared to the well known wet chemical methods, such as the ammonium paratungstate method which is referred to as the APT-method. In the chlorination method which utilizes hydrogen gas in the direct reduction of the chlorides to metal powder, it is difficult to obtain sufficiently coarse metal powder. For example, when reducing gaseous tungsten chloride with hydrogen, the maximum average particle size hardly exceeds 2 microns at best. The same is true for the other transition metals.

It would be desirable to provide a method of producing coarse transition metal powders and coarse transition metal carbides.

OBJECTS OF THE INVENTION

It is thus the object of the invention to provide a method of enlarging the particle size of transition metal powders selected from the group consisting of Ti, Zr, Hf, V, Nb, Ta, Cr, Mo and W.

Another object is to provide a method of enlarging the particle size of transition metal carbides during the carburization of fine transition metal powders.

These and other objects will more clearly appear when taken into consideration in conjunction with the following disclosure and the appended claims.

STATEMENT OF THE INVENTION

According to the present invention, coarse transition metal powder and/or coarse transition metal carbide can be produced by starting with fine metal powders. Thus, the invention enables the production of tungsten metal powder or tungsten carbide powder of, for example, 10 microns in size starting with tungsten powder having an average particle size of about 1 micron. As will be appreciated, one can start with a metal powder having the size of about 10 microns to produce a powder product having an enlarged particle size of about 20 to 30 microns.

Stating it broadly, the invention resides in a method of enlarging by heat treatment transition metal powder or, during carburization thereof, a transition metal carbide, based on a metal selected from the group consisting of Ti, Zr, Hf, V, Nb, Ta, Cr, Mo and W. The method comprises providing an intimate mixture of at least one transition metal powder with a small but effective amount of a metal dropping additive consisting essentially of a particle growth-promoting element selected from the group (Group 8 and 1b elements) consisting essentially of Cu, Ag, Au, Fe, Co, Ni, Ru, Rh, Pd, Os, Ir and Pt, and the mixture of the transition metal and said metal doping additive with carbon, the amount of carbon being sufficient to react substantially stoichiometrically with the transition metal to form the carbide; and then heating the mixture to an elevated temperature at which grain growth occurs.

It has been surprisingly found that the particle size of the transition metal powder and carbides thereof can be enlarged considerably with accuracy and reproducibility by heat treatment at a particle growth-promoting temperature in a reducing atmosphere by employing intimately mixed with the transition metal powder the metal doping additive in the preferred form of the chlorides of the growth-promoting elements Cu, Ag, Au, Fe, Co, Ni, Ru, Rh, Pd, Os, Ir and Pt. Temperatures in excess of 1000° C. are preferred.

The chlorides of the foregoing growth-promoting elements are advantageous in that they can be used in the powder form which makes them especially suitable for direct blending with the transition metal powder. In addition, the chlorides are further advantageous in that they can be easily dissolved in certain volatile liquids, such as alcohol.

Indications are that by varying the amounts of the metal chlorides and the temperature of heat treatment or carburization, it is possible to control the particle size within a very wide range with accuracy and reproducibility. The chlorides may be added directly in the form of powder, mixed or each one added separately, to, for instance, a tungsten powder before the heat treatment. A preferred method is to dissolve the chloride or chlorides in a volatile solvent, such as alcohol, following which the powder and alcohol solution are mixed and the alcohol later evaporated, the metal doping chlorides being deposited as a thin layer on the metal particles.

As stated hereinbefore, the heat treatment may consist essentially of the carburization process itself since the temperature thereof will promote particle growth in the presence of the metal doping additive. Thus, where it is desired to form tungsten carbide, the metal doping chloride is mixed with the tungsten powder together with carbon black, the amount of carbon being sufficient to combine stoichiometrically with the tungsten to form WC.

During the heat treatment, the metal chloride or chlorides are reduced to the corresponding metal when, for instance, hydrogen gas is used as a protective atmosphere. The reduced metal may then deposit out to form a microeutectic layer, for instance, on the surface of the tungsten particles at a temperature which normally exceeds 1000° C., the carburization being carried out at about 1400 to 1900° C. It is believed that the micromelts cause a reduction in the activation energy for particle growth and that larger particles of pure metals or metal carbide particles are formed from smaller units. If care is taken to mix the metal chloride uniformly with the metal powder, good reproducibility of the particle growth can be assured.

As chlorides are reduced to the metals, it is evident that a metal or any other suitable metal compound can also be used, but, as the pure metals of the Groups 8 and 1b do not normally occur in the particle sizes about 0.01 to 0.1 micron which are necessary for good blending, they are less preferred for use as direct metal doping additives. The chlorides have also been found to be superior to other metal compounds with respect to the reproducibility of the distribution of the doping metal and consequently of the particle growth. Chlorine is apparently very effective. Fluorides and iodides also give good results in these processes, which indicates that the halogen is active.

However, metal compounds other than the halides may also be used, the sole criterion being they they should decompose to the elementary metal under the conditions of the heat treatment without forming any detrimental by-products. For instance, a great number of metal salts of organic acids are useful. It is not difficult for one skilled in the art to determine if a certain metal compound is suitable for the purpose.

As mentioned above, very small but effective amounts of the so-called doping metals have an influence on the particle size of the transition metals and their carbides, such amounts ranging from at least about 0.03 percent by weight of pure additive metal based on the amount of the transition metal being treated. An excessive amount of doping metal may cause an undesirable sintering of carbide particles, and an upper limit of about 0.5 percent by weight, calculated as pure additive metal, has been found to be suitable. In the doping of the pure transition metals, the metal particles may also sinter together if the temperature of the heat treatment is too high.

The particle enlarging effect is achieved by all of the aforementioned metals of the groups 1b and 8 in the Periodic Table. Several of these metals are however less preferred than others. Those which are most preferred are iron, cobalt, nickel, copper and silver. The chlorides of the aforementioned metals are particularly suitable as the metal doping additive, such as copper monochloride, copper dichloride, iron trichloride, iron dichloride, cobalt dichloride and nickel dichloride.

Coarse carbide powder and especially tungsten carbide are used in the hard metal art. This is especially true of iron, cobalt and nickel doped carbides together with various metal matrix phases,. These materials have been tested and no detrimental effects due to the presence of the doping metal in the carbide particles have been noted. On the contrary, it has been advantageously and surprisingly noted that at relatively high doping temperatures, for instance, at a carburization temperature of about 1800° C., extremely uniform particle size distribution together with a uniform microstructure of the hard metal is obtained. This results in a markedly improved performance of the hard metal. For example, the mechanical properties, such as bending strength, are considerably improved in comparison with a conventional hard metal having substantially the same average particle size. Thus, doped carbides do not only mean a coarser average particle size, but also an improved product.

With regard to the production of electric components, such as electrical contacts, such as electrical contacts, tungsten doped with nickel, copper or silver has turned out to be very useful. Because doping at high temperatures gives a very even or uniform particle size distribution, improved performances are obtained. For instance, compared with a conventional product, the electric conductivity is increased.

As illustrative of the various embodiments of the invention, the following examples are given:

Example 1

Three batches of 1 kg. each of tungsten powder having a particle size of 0.9 micron and 6.25 percent by weight of carbon black were carefully and uniformly mixed for 1.5 hours with cobalt dichloride corresponding to 0.1, 0.2 and 0.3 percent by weight of metallic cobalt, respectively, based on the weight of tungsten. A reference batch without cobalt dichloride was also prepared. Each of the mixtures were heated under hydrogen gas at 1600° C. for 1 hour and the particle sizes were compared to those of the pure tungsten-carbon black-mixture. The following results were obtained:

TABLE 1

| Percent Co in W: | Grain size of the carbide in microns |
|---|---|
| 0.1 | 2.4 |
| 0.2 | 4.1 |
| 0.3 | 7.1 |
| 0 (reference) | 1.6 |

The example shows that the particle size of the carbide increases with an increasing content of cobalt in the tungsten powder.

Example 2

Three batches of 1 kg. each of tungsten powder having a particle size of 0.9 micron were mixed well with cobalt dichloride dissolved in pure alcohol. The cobalt content corresponded to 0.3 percent by weight of the tungsten content. The alcohol was evaporated from the powder, after which 6.25 percent by weight of carbon black was uniformly mixed with the dried powder. Each of the mixtures was heated for 1 hour at 1400, 1600 and 1800° C., respectively. Hydrogen gas was used as protective atmosphere gas. As a reference, a mixture of pure tungsten and carbon black was used, which was treated in an analogous manner at each of the foregoing temperatures.

TABLE 2

| Carburation temperatures, ° C. | Grain size in microns | |
|---|---|---|
| | W+Co+C mixture | W+C reference mixture |
| 1,400 | 3.8 | 1.3 |
| 1,600 | 7.2 | 1.6 |
| 1,800 | 12.5 | 2.2 |

The example shows that coarse carbide powders can be obtained at both a moderate carburization temperature and a moderate cobalt addition.

Example 3

Titanium powder of about 5 microns average size is increased in size by uniformly mixing with 1 kg. of the powder an amount of nickel formate corresponding to about 0.2% nickel based on the titanium content. The mixture is heated for about 2 hours at 1200° C. to increase the particle size.

Example 4

Two kilograms of niobium powder of about 7 microns average size is mixed with copper acetate dissolved in ether, the amount of copper corresponding to about 0.4% by weight of the niobium powder. The mixture is heated at 1200° C. for 1 hour to increase the particle size of niobium.

Example 5

In the production of molybdenum carbide ($Mo_2C$) 1 kilogram of molybdenum powder of between 2 to 5 microns in size is mixed with chlorplatinic acid dissolved in alcohol, the amount of platinum corresponding to about 0.08% by weight of the molybdenum powder. Following drying of the mixture, carbon black is blended into the mix in an amount corresponding stoichiometrically to about 6.25% by weight of the molybdenum content to produce $Mo_2C$. The mixture is carburized at 1400° C. under hydrogen for about 1.5 hours to produce coarse molybdenum carbide powder.

Example 6

One kilogram of zirconium powder of about 3 to 6 microns in size with ruthenium tetrachloride dissolved in alcohol. The amount of contained ruthenium metal corresponds to about 0.1% by weight of the zirconium content. The mixture is dried and an amount of carbon black corresponding to 13.2% by weight of the zirconium metal is uniformly mixed with the doped powder, the amount being stoichiometrically determined to produce ZrC. The carburization treatment is carried out at 1500° C. for about 2 hours in hydrogen to produce coarse zirconium carbide particles.

As stated above, it is preferred that the temperature exceed 1000° C. and preferably be at least about 1200° C. In producing coarse carbide particles, the temperature preferably ranges from about 1400° C. to 1900° C.

The metal doping additive should preferably be a compound that decomposes easily to release the metal thereof. Decomposable compounds of the metals of Group 8 and 1b of the Periodic Table (i.e. Cu, Ag, Au, Fe, Co, Ni, Ru, Rh, Pd, Os, Ir and Pt) may include the halides and decomposable organic compounds which do not leave a residue after decomposition. Thus, the metal doping additives include the fluorides, chlorides, iodides and the bromides of the foregoing metals. The foregoing salts are preferably employed dissolved in a volatile solvent, such as certain organic solvents, e.g. alcohol, ether, etc.

Other decomposable compounds of the foregoing particle growth-promoting elements are acetates, formates and the like.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of enlarging by heat treatment at an elevated particle growth-promoting temperature the particle size of at lease one transition metal powder selected from the group consisting of Ti, Zr, Hf, V, Nb, Ta, Cr, Mo and W and carbides thereof formed during the carburization of at least one of said transition metals with carbon at an elevated temperature which comprises:
   providing an intimate mixture of said at least one transition metal with a small but effective amount of a metal doping additive consisting essentially of a particle growth-promoting element selected from the group consisting of Cu, Ag, Au, Fe, Co, Ni, Ru, Rh, Pd, Os, Ir and Pt and mixtures of at least one of said transition metals and said metal doping additive together with carbon,
   and heating said mixture to said elevated temperature at which grain-growth occurs,
       whereby the amount of grain growth of the group of said at least one transition metal and carbide thereof is markedly improved as compared to the same treatment without the presence of the metal doping additive.

2. The method of claim 1, wherein the amount of the particle growth-promoting element corresponds to about 0.03 to 0.5% by weight of the at least one transition metal powder being treated.

3. The method of enlarging by heat treatment at an elevated particle growth-promoting temperature the particle size of at least one transition metal powder selected from the group consisting of Ti, Zr, Hf, V, Nb, Ta, Cr, Mo and W which comprises:
   providing an intimate mixture of at least one transition metal powder with an amount of a metal doping additive selected from the group consisting of chlorides of a particle growth-promoting element selected from the group consisting of Cu, Ag, Au, Fe, Co, Ni, Ru, Rh, Pd, Os, Ir and Pt, the amount of the growth-promoting element corresponding to about 0.03 to 0.5% by weight of the at least one transition element being treated,
   and heating said mixture to said elevated temperature in excess of 1000° C. at which particle growth occurs,
       whereby the amount of particle growth of said at least one transition metal is markedly improved as compared to the same treatment without the presence of the metal doping additive.

4. The method of claim 3, wherein the transition metal is tungsten.

5. A method of enlarging during carburization heat treatment the particle size of a carbide of at least one transition metal powder selected from the group consisting of Ti, Zr, Hf, V, Nb, Ta, Cr, Mo and W which comprises:
   providing an intimate mixture of at least one transition metal with carbon sufficient to convert the transition metal to carbide and with an amount of a metal doping additive selected from the group consisting of chlorides of a particle growth-promoting element of Cu, Ag, Au, Fe, Co, Ni, Ru, Rh, Pd, Os, Ir and Pt, the amount of the growth-promoting element corresponding to about 0.03 to 0.5% by weight of the at least one transition element being converted to the carbide,
   and heating said mixture to a carburizing temperature in excess of 1000° C. at which particle growth also occurs,
       whereby the amount of particle growth of said at least one transition metal carbide is markedly improved as compared to the same treatment without the presence of the metal doping additive.

6. The method of claim 5, wherein the temperature is in excess of 1200° C. and the transition metal is tungsten.

7. The method of claim 6, wherein the metal doping additive is cobalt dichloride dissolved in alcohol.

8. The method of claim 6, wherein the carburizing temperature ranges from about 1400 to 1900° C.

9. A method of enlarging during carburization heat treatment the particle size of tungsten carbide which comprises:
   providing an intimate mixture of tungsten powder with carbon stoichiometrically sufficient to form tungsten carbide and with an amount of a metal doping additive selected from the group consisting of chlorides of a particle growth-promoting element of Cu, Ag, Au, Fe, Co, Ni, Ru, Rh, Pd, Os, Ir and Pt, the amount of the growth-promoting element corresponding to about 0.03 to 0.5% by weight of the at least one transition element being converted to the carbide, and heating said mixture in the presence of hydrogen to a carburizing temperature in the range of about 1400° C. to 1900° C. at which particle growth also occurs,
  whereby the amount of particle growth of tungsten carbide formed during carburization is markedly improved as compared to the same treatment without the presence of the metal doping additive.

References Cited
UNITED STATES PATENTS

| | | | |
|---|---|---|---|
| 3,661,557 | 5/1972 | Svanstrom | 75—0.5 BB |
| 3,177,067 | 4/1965 | Nichols | 75—0.5 BB |

WAYLAND W. STALLARD, Primary Examiner

U.S. Cl. X.R.

75—0.5 BC; 423—440